United States Patent [19]

Yamamoto

[11] Patent Number: 4,499,876
[45] Date of Patent: Feb. 19, 1985

[54] FUEL INJECTION CONTROL FOR INTERNAL COMBUSTION ENGINES

[75] Inventor: Yoshihisa Yamamoto, Kariya, Japan

[73] Assignee: Nippondenso Co., Ltd., Kariya, Japan

[21] Appl. No.: 428,619

[22] Filed: Sep. 30, 1982

[30] Foreign Application Priority Data

Oct. 30, 1981 [JP] Japan .................. 56-173833
Jan. 20, 1982 [JP] Japan .................... 57-7199

[51] Int. Cl.³ ............................. F02B 77/00
[52] U.S. Cl. .................. 123/446; 123/479; 123/481; 123/198 F; 73/119 A
[58] Field of Search .......... 123/446, 478, 479, 481, 123/198 DB, 198 F; 73/119 A

[56] References Cited

U.S. PATENT DOCUMENTS

| | | | |
|---|---|---|---|
| 1,465,474 | 8/1923 | Hesselman | 123/446 |
| 4,024,850 | 5/1977 | Peter et al. | 123/198 F |
| 4,280,464 | 7/1981 | Kanai et al. | 123/478 |
| 4,366,794 | 1/1983 | Hachiga et al. | 123/479 |
| 4,395,905 | 8/1983 | Fujimori et al. | 123/479 |
| 4,398,520 | 8/1983 | Schulz et al. | 123/481 |

Primary Examiner—Magdalen Y. C. Moy
Attorney, Agent, or Firm—Cushman, Darby & Cushman

[57] ABSTRACT

A method and apparatus for controlling the injection of fuel into an internal combustion engine having a plurality of unit injectors which are each controllable separately for each cylinder of the engine. The occurrence of a malfunction in the fuel injection of each of the injectors is discriminated in accordance with the engine operating condition detected by sensors whereby when the presence of a malfunction in the injector of any one of the cylinders is discriminated, the operation of the engine is not stopped but the operation is continued in a fault mode of operation so that the injection of fuel from the malfunctioning injector is stopped and the injection of fuel from the injector of at least one of the other cylinders is stopped or its number of events of injection is decreased from the standpoint of balance in the generation of engine power output.

9 Claims, 11 Drawing Figures

FUEL INJECTION CONTROL FOR INTERNAL COMBUSTION ENGINES

BACKGROUND OF THE INVENTION

1. Field of the Invention

The present invention relates to a control system which is effective in case of failure of fuel injection units for internal combustion engines, particularly Diesel engines.

2. Description of the Prior Art

Fuel injection control systems heretofore known for use in multiple-cylinder internal combustion engines have been so designed that a fuel injector having an electric actuator is provided for each cylinder and the injection of fuel is controlled separately for each of the injectors in accordance with an electric control signal from a control unit. However, if, for example, a fault occurs in the fuel measuring portion of the fuel injector making it impossible to control the quantity of fuel injected or increasing the quantity of fuel injection, the engine is caused to overrun and a very dangerous condition results. However, these control systems have no preventive function to overcome these difficulties. Also, when a fault occurs so that the injection of fuel into any of the cylinders is stopped suddenly, it is no longer possible to maintain the balance of the engine setting it into abnormal vibration and the known control systems cannot prevent it.

In particular, if the above-mentioned fault in the fuel metering portion renders the fuel injection control inoperable with the injection quantity being increased, the engine is caused to overrun and there is possibility of endangering life in some cases. Particularly, even in the case of electronic control systems, their safety functions amount to no more than cutting off the injection of fuel and stopping the engine operation upon occurrence of such fault. However, these safety functions have the following disadvantages and do not meet the needs of the users in recent years. In other words, if such fault occurs during the running on an express-way, winter mountain road or deserted agricultural road or where the engine is used as a driving source for the hydraulic power supply of the hydraulic units in operation, the stopping of the engine gives rise to secondary hazards. As a result, even such a fault occurs, it is important to keep the engine operating by overcoming all difficulties and find one's way to a safe place.

SUMMARY OF THE INVENTION

It is the primary object of the present invention to provide a method of controlling the injection of fuel in a multiple-cylinder internal combustion engine, which is so designed that even if a malfunction occurs in the injection of a fuel injector of any cylinder, the operation of the engine is not stopped and the engine operation is continued in a fault mode of operation.

In accordance with the invention, when it is detected that fuel measurement control means, e.g., an actuator of an injector for any cylinder has become faulty with the fuel supply still possible, at least the operation of the faulty injector is not stopped but the faulty injector is changed to a faulty mode of operation and the amount of fuel supplied through the faulty actuator to a pump working fluid chamber below a plunger is controlled through the control of the operation of a valve mechanism which allows a piston and the plunger to move upward.

Thus, even if a fault occurs in a part of the injector of any cylinder, there is no need to stop the operation of the engine with the result that an engine operation close to the normal operation is maintained only with some deterioration of the acceleration and deceleration properties and moreover any damage to the engine due to an engine overrun condition or the occurrence of abnormal vibrations in the engine is prevented.

Also, in another fault mode of operation, for example, control signals are applied to the malfunctioning injector to cut off the fuel injection and simultaneously another control signals are applied to the injector of at least one of the other cylinders having a particular order of arrangement relation with the order of arrangement of the cylinder associated with the malfunctioning injector from the standpoint of balance in the generation of power output so as to cut off the injection of fuel or decrease the number of events of fuel injection.

As a result, while, in the past, it has been necessary to stop the operation of the engine when a malfunction occurs in the injector of any cylinder, in accordance with the present invention the control signals for a fault mode (a control mode different from the normal operation control mode) are supplied to the injectors of the respective cylinders and the engine operation is continued without damaging the engine by abnormal vibrations due to any unbalance in power output among the cylinders of the engine but with some deterioration of the operating properties as compared with the normal operation. Thus, there is the effect of preventing various hazards due to the stopping of the engine operation on an expressway, winter mountain road or the like and thereby improving the safety function.

DESCRIPTION OF THE PREFERRED EMBODIMENTS

Figure 1:
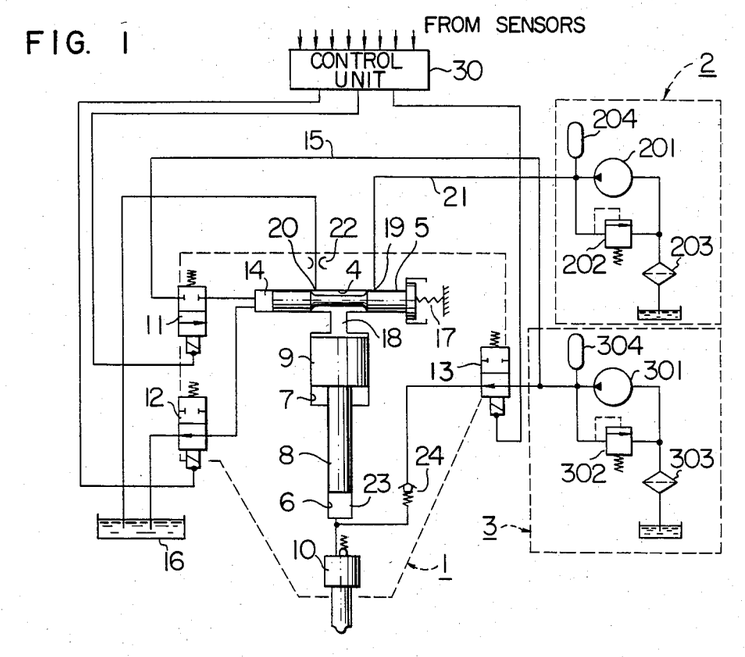
FIG. 1 is a schematic diagram showing the construction of a fuel injection system for a six-cylinder engine in which an injector is shown only for one cylinder.

An embodiment of the invention will now be described with reference to the drawings. FIG. 1 shows the construction of a fuel injection system for a six-cylinder engine in which an injector is shown only for one cylinder, e.g., an electronically controlled hydraulic-actuated Diesel injection system. Numeral 1 designates a unit injector provided for each cylinder, and 2 and 3 designate respectively a high-pressure source and low-pressure source as a whole. The unit injector 1 comprises an oil-tight bore 4, a change-over valve 5 comprising for example a spool valve disposed to slide from side to side in the Figure within the bore 4, oil-tight bores 6 and 7, a small-diameter plunger 8 and a large-diameter piston 9 which are substantially integral with each other and are respectively disposed to slide vertically within the bores 6 and 7, an injection nozzle 10 for receiving the fuel delivered under pressure from the plunger 8, and three electromagnetic valves 11, 12 and 13. A change-over valve working fluid chamber 14 is defined within the bore 4 on one side of the change-over valve 5 and the chamber 14 is communicated with the low-pressure source 3 through the electromagnetic valve 11 comprising a two-way on-off valve and a pipe 15 and also communicated with a fuel reservoir tank 16 through the electromagnetic valve 12 comprising a two-way on-off valve. On the opposite side of the working fluid chamber 14 a spring 17 biases the change-over valve 5 to the left in the illustration or in a direction to decrease the working fluid chamber 14. A piston working fluid chamber 18 is defined by the bore 4 at the intermediate small-diameter portion of the change-over valve 5 and the bore 7 upstream of the piston 9. The piston working fluid chamber 18 is selectively communicated with two ports 19 and 20 in dependence on whether the change-over valve 5 is at either of its left and right positions. The port 19 is communicated with the high-pressure source 2 through a pipe 21 and the other port 20 is communicated with the tank 16 through a restrictor 22. Defined within the bore 6 downstream of the plunger 8 is a pump working fluid chamber 23 which is communicated with the nozzle 10 and also communicated with the low-pressure source 3 through a check valve 24 and the electromagnetic valve 13 comprising a two-way on-off valve. A control unit 30 has its input ports connected electrically to various sensors and its output ports connected electrically to the electromagnetic valves 11, 12 and 13 to supply control signals thereto.

The pressure sources 2 and 3 form the ordinary constant hydraulic pressure sources comprising respectively pumps 201 and 301, relief valves 202 and 302, filters 203 and 303 and accumulators 204 and 304.

The operation of the above-described system is as follows. In the illustrated positions, the electromagnetic valve 11 is closed and the electromagnetic valve 12 is opened so that the high-pressure source 2 is disconnected with the change-over valve working fluid chamber 14 and the chamber 14 is communicated with the reservoir tank 16. As a result, the change-over valve 5 is moved to the left position by the spring 17 so that the port 20 is communicated with the piston working fluid chamber 18 and thus the fuel in the chamber 18 is ready to be released to the reservoir tank 16. In this condition, if the control unit 30 applies to the electromagnetic valve 13 a control signal which provides a valve open duration of a length corresponding to the desired injection quantity, the valve 13 is opened for this duration as shown in the Figure so that the fuel from the low-pressure source 3 is introduced into the pump working fluid chamber 23 through the check valve 24 and the chamber 23 is filled to the desired level. Then, the fuel measuring electromagnetic valve 13 is closed. In this case, the piston 9 and the plunger 8 are moved upward.

When the electromagnetic valve 11 is opened and the electromagnetic valve 12 is closed, the hydraulic pressure from the pressure source 3 acts in the change-over valve working fluid chamber 14 via the pipe line 15 and also the chamber 14 is disconnected with the reservoir tank 16. As a result, the changeover valve 5 is moved to the right against the spring 17 so that the port 20 is closed and the port 19 is opened. Thus, the hydraulic pressure from the high-pressure source 2 is introduced into the piston working fluid chamber 18 through the pipe 21 and this hydraulic fluid moves the piston 9 and the plunger 8 downward. In this case, a superhigh pressure is produced in the pump working fluid chamber 23 which theoretically corresponds to the pressure of the chamber 23 increased to the piston-plunger cross-sectional area ratio times the hydraulic pressure of the pressure source 2. This superhigh-pressure fuel is prevented from flowing backward by the check valve 24 and it is supplied to the nozzle 10, thereby injecting the fuel into the combustion chamber of the engine which is not shown.

Figure 3:
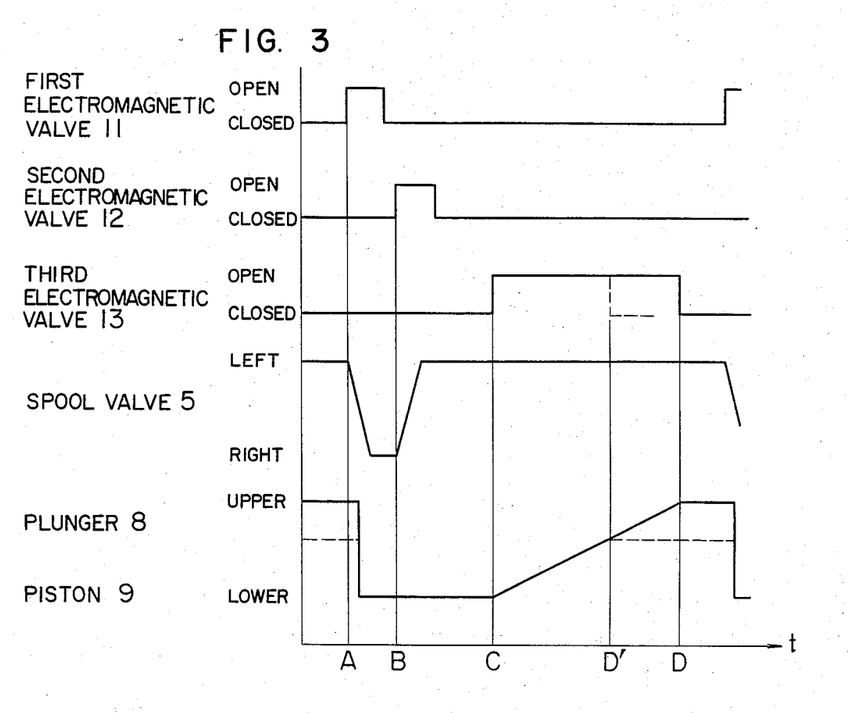
FIG. 3 is a diagram showing the timing of control operations in a normal mode of operation.

Described so far is the operation during the normal engine operation and it will be described further with reference to the timing diagram of FIG. 3. With the second electromagnetic valve 12 being closed, if the first electromagnetic valve 11 is closed at a timing A, the spool valve 5 is moved to the right by the hydraulic pressure and then the piston 9 and the plunger 8 are pressed downward thereby injecting the fuel. Then, the first electromagnetic valve 11 is closed at a timing B and the spool valve 5 with the opened second electromagnetic valve 12 is moved back to the left. Then, the second electromagnetic valve 12 is closed. In this condition, the third electromagnetic valve 13 is opened at a timing C and held open up to a timing D during which period the plunger 8 and the piston 9 are moved upward and the injection fuel is introduced. The condition in this period is shown in FIG. 1. When the third electromagnetic valve 13 is closed at the timing D, the timing A in the next cycle is reached in that condition. It will be seen that in this case the injection quantity is controlled in accordance with the length of the time interval CD. As a result, at a part-load operation the controlled valve open duration is changed to an interval CD′ shown by the broken line in the Figure.

Next, the control method in a fault mode of operation will be described with reference to the similar timing diagram of FIG. 4. What is to be noted here is the fact that the third electromagnetic valve 13 is held open and is not operated. Thus, the third electromagnetic valve 13 is not energized and also it is not shown in the Figure. The first electromagnetic valve 11 is opened at the timing A in the Figure and the fuel is injected as in the case of the normal engine operation. However, the timing of opening the second electromagnetic valve 12 is delayed than in the case of the ordinary operation and this delay time is qualitatively such that the timing B is determined conversely by going back from the timing A of the next cycle by about the controlled valve open duration CD of the ordinary operation and the valve 12 is opened. Since the third electromagnetic valve 13 is already open, if the spool vlave 5 is moved to the left in this condition, the injection fuel is immediately introduced and the introduction is completed at the timing A of the next cycle or the injection timing thereby controlling the injection quantity in accordance with the duration of the interval BA (A is of the next cycle). In this mode, the accuracy of fuel measurement during the periods of acceleration and deceleration is deteriorated as mentioned previously. This is due to the fact that the timing A of the controlled duration time BA is the injection timing of the next cycle and the timing B is determined in anticipation of the timing A and during the periods of acceleration and deceleration the timing A will be changed from what is anticipated at the timing B. However, this is sufficient for the purpose of operating the engine one way or another.

Next, the overall control flow will be described with reference to the flow chart of FIG. 5. After the necessary initial states have been set by a step 401, the data from the various sensors are inputted by a step 402. These data include for example the TDC mark, engine speed, accelerator position, cooling water temperature, lubricating oil temperature, intake air temperature, intake air pressure, exhaust gas temperature and pressure source pressure. As will be described later, in accordance with these sensor data, a step 403 determines whether the fuel measuring electromagnetic valve 13 is malfunctioning. If there is no malfunction, a step 404 performs the computation of ordinary mode fuel measurement timing through the control unit 30 and controls as described in connection with FIG. 3. Then, the sensor data are inputted again and the computation is performed from instant to instant according to the loop. When a malfunction is detected, a step 407 performs the computation of fault mode fuel measurement timing and then controls as described in connection with FIG. 4. This control may be performed only with respect to any faulty cylinder if the system is capable of detecting the faulty cylinder and with respect to all the cylinders if the system is not. As an example of the fault detecting method, an engine RPM sensor is used which is designed to generate a pulse at intervals of a given rotation, for example, and indicates a momentary speed. The control unit 30 monitors the engine speed and determines the occurrence of a malfunction when the speed variation upon each combustion exceeds a discrimination speed. Another method may be to provide a piston position sensor and feed back the intake quantity.

The present invention is applicable to any system in which the fuel measurement and fuel delivery operation are controlled by separate actuators. For instance, the electromagnetic valves 11 and 12 may be replaced by a single two-position three-port connection valve and also the spool valve 5 itself needs not be operated by means of the hydraulic pressure and electromagnetic valves but it may be of the solenoid-actuated type which is directly operated by electromagnetic force. Also, it is needless to say that there is no limitation of the construction, number and type of working fluid of the pressure sources. Also, it should be apparent that there is no limitation to the type of nozzles and the invention is applicable to any modified mechanisms such as one in which a spill circuit is provided for the plunger. Further, while, in the embodiment, the digital control circuit is used, it may be replaced with an analog circuit. Further, the fuel meansuring electromagnetic valve may be of any different type and it may be positioned upstream or downstream of the restrictor 22. In either case, the restrictor 22 may be positioned on the inlet side of the measured fuel.

Figure 6:
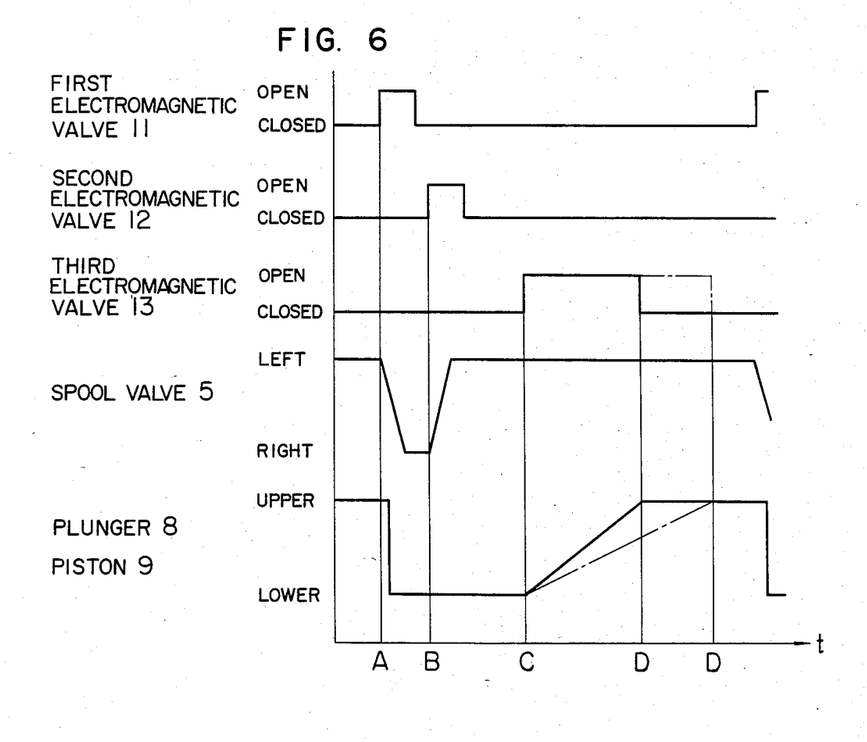
FIG. 6 is a diagram showing the timing of control operations in a fault mode of operation according to another embodiment of the invention.

What is to be noted here is that if a malfunction occurs in any part of the fuel measuring circuit other than the electromagnetic valve, that is, if the restrictor slips off its position, there is the danger of it being mistakenly detected as a fault in the electromagnetic valve depending on the construction of systems. In such a system, if only the corresponding cylinder is operated in the fault mode, the fuel measuring electromagnetic valve is held in the closed position and the operation of the cylinder is stopped. To prevent the cylinder from being stopped operating, it is only necessary that if the stopping of the operation is detected by the similar method, the operating mode is changed to a second fault mode of operation in which the control is effected by the control timing of FIG. 6 and the valve opening duration of the fuel measuring electromagnetic valve is changed from the normal operation duration CD to a shorter duration CD".

As described hereinabove, in accordance with the invention there is an advantage that in a fuel injection system of the type in which each cylinder is provided with an injector unit comprising forced delivery means, valve means for controlling the operation of the forced delivery means and a separate fuel measuring actuator and a control unit receives various sensor data and generates signals to control the valve means and the actuator, if a fault occurs in some part of any injector unit in a condition where it is still allowed to supply fuel or increase the quantity of fuel injected, the fuel measuring actuator or the valve means for controlling the operation of the forced delivery means is operated in the fault mode so that the fuel measurement is allowed without stopping the operation of the engine and also the danger of an overrun condition due to the fault can be prevented. There is an additional advantage that in the case of a system using digital circuitry, the method of this invention can be applied basically without any addition or modification of the existing construction but by simply modifying the control program.

Figure 2:
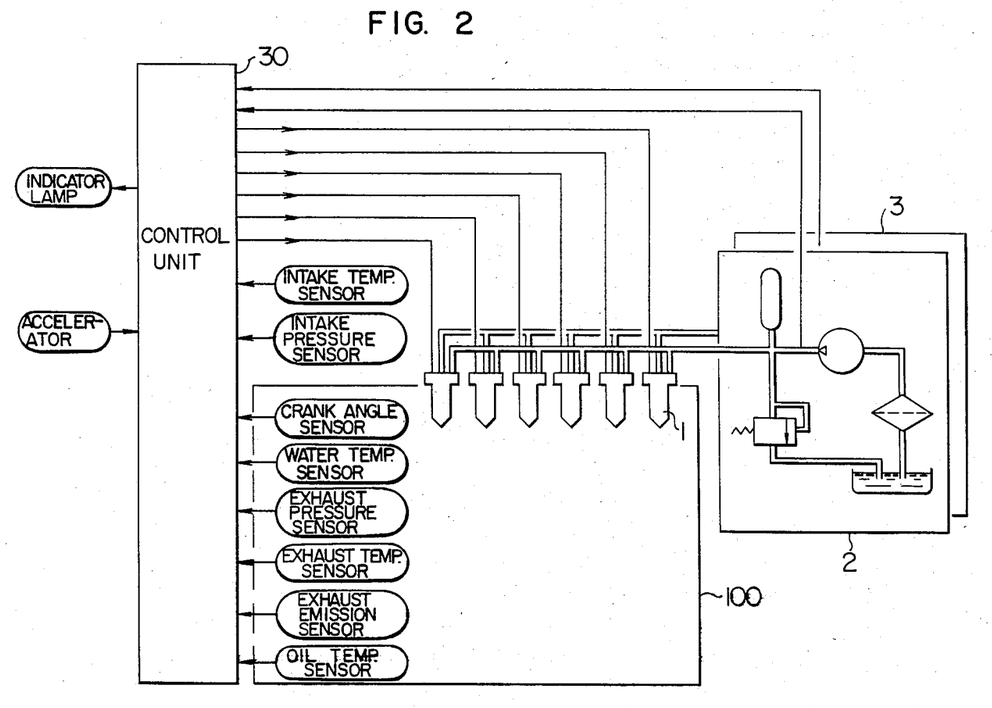
FIG. 2 is a schematic diagram showing the construction of a fuel injection control system for a six-cylinder engine.

Next, another embodiment of the invention will be described. In the embodiment shown in FIG. 2, the invention is applied to a fuel injection control system for a six-cylinder engine. An engine 100 includes six units of the injector 1 of FIG. 1 comprising the spool valve 5, the plunger 8, the piston 9, the nozzle 10, the electromagnetic valves 11, 12 and 13 and the engine 100 also includes various sensors such as a crank angle sensor, water temperature sensor, etc., which are connected to a control unit 30. The control unit 30 essentially comprises a microcomputer and it also comprises electromagnetic valve driver circuits, etc., thereby detecting the operating conditions of the engine in response to the sensors and effecting controls in accordance with a program. The control unit 30 is capable of separately controlling the injector 1 of each cylinder. Also, by virtue of the recent developments in the field of microcomputers, various computational operations can be performed faster than previously and this fact can be utilized not only to separately control each cylinder but also control every injection of each cylinder respectively.

Next, the control method of the invention for maintaining the safety function upon occurrence of any abnormal injection will be described. During the normal operation effected as mentioned previously, if any malfunction such as failure of the electromagnetic valve 13 to restore while in the open position, coming off of the restrictor 22, short-circuiting of the signal line to the electromagnetic valve 13, fault in the output stage of the control unit or abnormal pressure of the pressure sources occurs, the quantity of fuel injected is increased extremely and it becomes difficult to control the fuel injection. As mentioned previously, this leads to an engine overrun condition and gives rise to a very dangerous phenomenon. Particularly, in the case of an internal malfunction of the control unit which affects all of the six cylinders, it becomes more dangerous. Such a condition can be accurately recognized by the computer in accordance with the data from the various sensors including the crank angle sensor, exhaust gas temperature sensor, exhaust emission sensor, etc. Also, the presence of any malfunction in the unit injector of each cylinder can also be discriminated from the variation in the engine speed corresponding to the combustion timing of each cylinder. Thus, the microcomputer of the control unit 30 changes the operating condition to a fault mode of operation so that the driver is alerted to the fault and the minimum standard of operation is continued safely.

The fault mode of operation will now be described in detail and there is a great feature that each cylinder as well as each injection can be separately controlled as desired. Thus, if the number of the faulty cylinders is small, e.g., when a fault occurs in only one of the cylinders, only the faulty cylinder is rendered inoperative and the injection of fuel into any other required cylinder or cylinders is stopped or stopped intermittently in accordance with the need for the mechanical and thermal balancing of the engine. Also, the quantity of fuel injected into the other operating cylinders may be increased or decreased so as to ensure the required torque of the engine on the whole. In the case of a malfunction affecting all the cylinders, the number of the cylinders to be operated is determined in consideration of a balance with the engine power output and the other cylinders are stopped thereby providing the effect of decreasing the injection quantity on the whole. In this case, the operation may be effected by shifting the position of the operating cylinders in timed relation in consideration of the mechanical and thermal balance. This can be accomplished with respect to every injection as mentioned previously. In this case, where the number of the faulty cylinders is small as mentioned previously, although it differs for different engines, the optimum selection of the other cylinder or cylinders for balancing purposes is apparent in accordance with the number and arrangement of the cylinders, the type of the engine and the designe parameters of the engine and thus it can be accomplished preliminarily.

Figure 4:
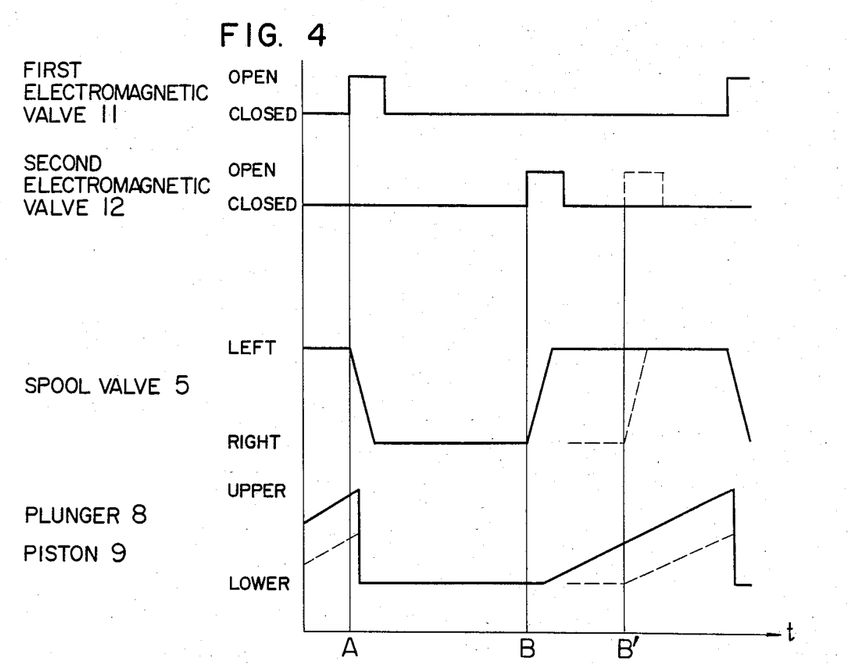
FIG. 4 is a diagram showing the timing of control operations in a fault mode of operation.
Figure 5:
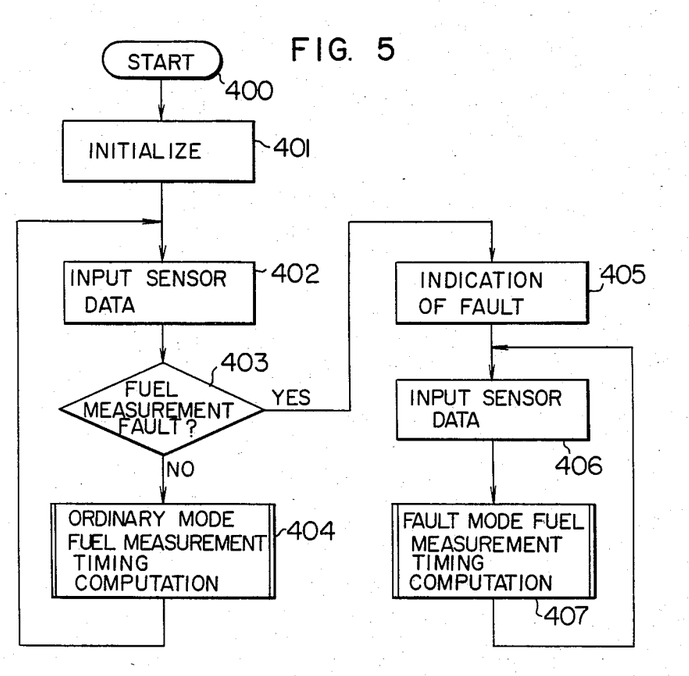
FIG. 5 a flow chart showing an overall control flow.
Figure 7:
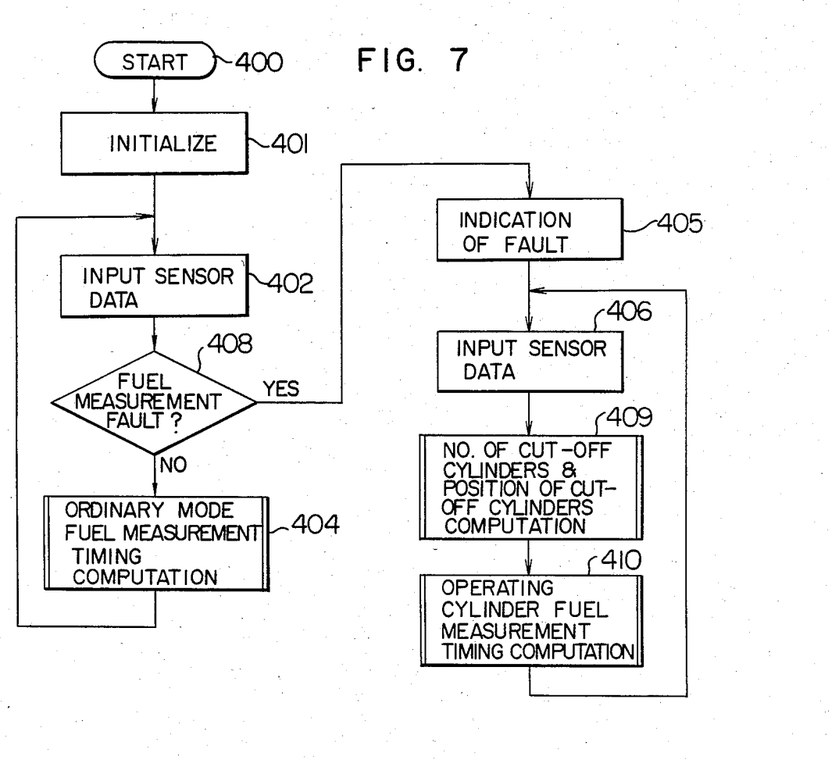
FIG. 7 is a flow chart showing another control flow.

FIG. 7 is a flow chart showing the above-mentioned control flow and it is the same with the flow chart of FIG. 4 except steps 408, 409 and 410. What is to be particularly noted here is the fact that this control is repeatedly performed from instant to instant and thus the conditions can be modified for each injection as mentioned previously.

Figure 8:
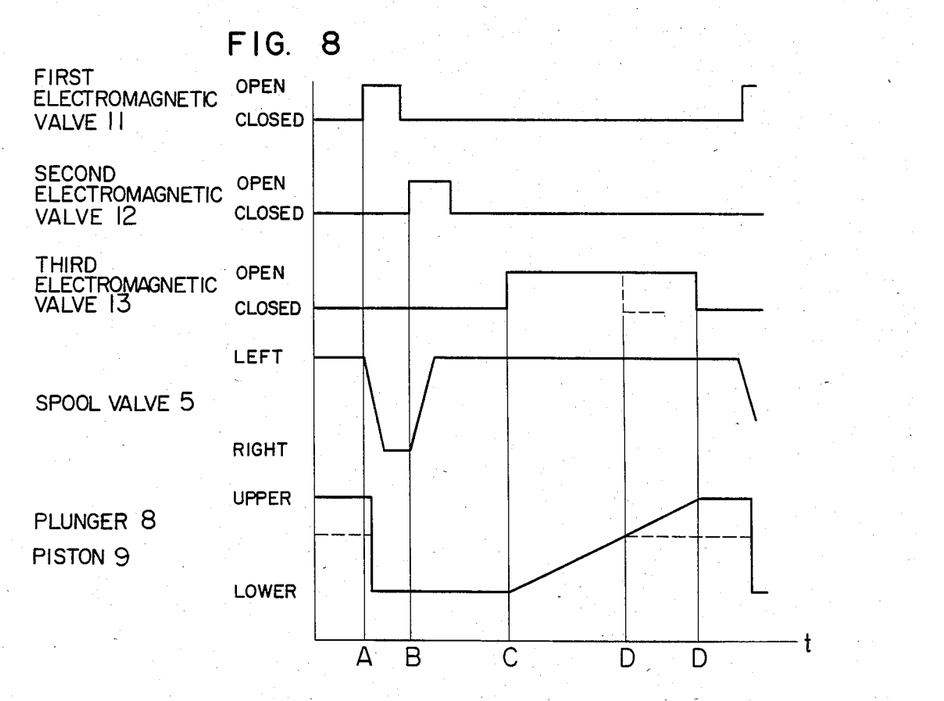
FIG. 8 is a diagram showing the timing of operations per injection of the electromagnetic valves, spool valve, etc., of each fuel injector.
Figure 9:
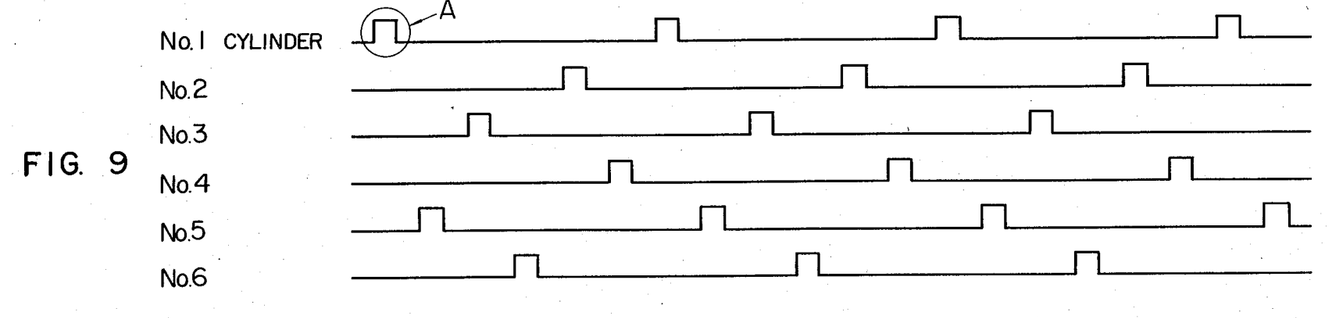
FIG. 9 is a diagram showing the timing of control signals during a normal operation of a six-cylinder engine.

The control will now be described in greater detail with reference to timing diagrams, and FIG. 8 is a timing diagram showing the operation of the known injector 1. As will be seen from the Figure, three electromagnetic valve signals are generated for every injection. FIG. 9 shows the timing of mechanical rotation for every injection as a whole. In this Figure, indicated at A is what is taken all together for every injection per cylinder. The Figure shows the case of a six-cylinder engine having a firing order 1-5-3-6-2-4.

Figure 10:
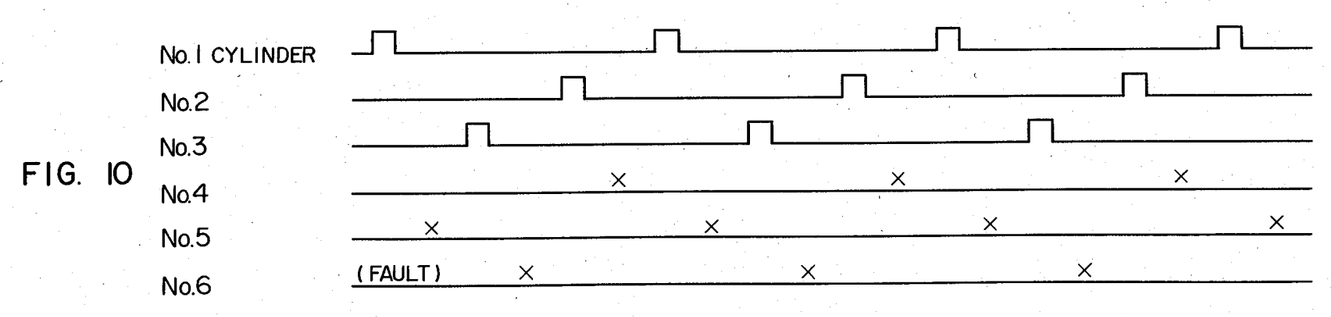
FIGS. 10 and 11 are diagrams showing the timings of control signals during a fault mode of operation of a six-cylinder engine.

The control will now be described by way of example with reference to a fault mode of operation where the No. 6 cylinder is malfunctioning with the injection quantity being increased abnormally. FIG. 10 shows an example of the fault mode of operation and of course the operation of the No. 6 cylinder is stopped by cutting off the current flow. In addition, the No. 4 and No. 5 cylinders are stopped for engine balancing purposes and the engine operation is continued in this way. Since the power output is reduced to ½, the quantity of fuel injected into the Nos. 1, 2 and 3 cylinders may be increased if only it is required and allowed by the conditions.

Figure 11:
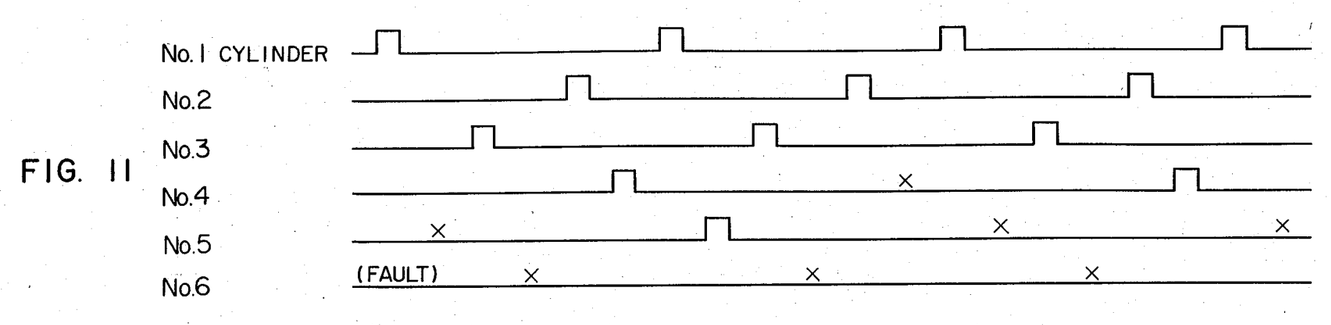

FIG. 11 shows an example of another mode of operation. In this example, the injection into the faulty No. 6 cylinder is stopped and the Nos. 4 and 5 cylinders are subjected to a thinned operation with the reduced number of events of injection. In other words, the No. 4 cylinder is fired (fuel is injected) on alternate time and the No. 5 cylinder is fired on every fourth time. This example is an intermediary between the normal operation and the case of FIG. 10.

As another example of the fault mode, in the case of a relatively minor fault such as only the loosening of the restrictor 22, it is possible to use an additional measure of effectively dealing with the fault by decreasing the fuel measuring time (the energization period CD of the electromagnetic valve 13 in FIG. 8) of the faulty cylinder.

While, in the fault mode of this embodiment, the number of cylinders is thinned out, it is possible to operate all the cylinders and effect a thinned operation in timed relation and it is also possible to use the two in a mixed manner. The operating conditions in these fault modes must be selected to provide the optimum pattern in accordance with the engine used, the manner of using the engine and the state of the fault.

It will be seen that the fault modes of the fuel measuring section described in connection with the embodiments can be practically applied as such, with the addition of a discrimination algorithm, to cases where a malfunction occurs in the injection control section (a malfunction in the spool valve 5, the plunger 8, the piston 9, the electromagnetic valve 11 or 12, the pressure source 2 or the associated output sections of the control unit 30) thereby making the normal injection impossible. In other words, the occurrence of any unbalancing of the engine due to the stopping of the faulty cylinder can be prevented and the engine operation can be continued safely. However, it should be noted that these fault modes cannot be applied to any fault which affects all the cylinders or makes the injection of fuel into all the cylinders impossible.

In short, it will be seen that in response to each and every injector malfunction, the operation is switched to a suitable fault mode of operation thereby continuing the engine operation.

The injector shown and described by way of example is of the simplest type which utilizes the fuel as the working fluid for the hydraulic actuating section and the invention is still applicable even if the number and construction of pressure sources are changed or the number, position and piping of the accumulators are changed. Also, the invention is of course not limited to the illustrated construction of each injector 1 itself and any other construction can be used.

Further, while, in the above-described embodiments, the control unit comprises a microcomputer, if the conditions permit as in the case of low-speed engines, the control unit may be comprised of analog circuitry or conversely it may be comprised of a multi-processor system.

Still further, each fault mode is not limited to one pattern and suitable modes may be used selectively or in combination with a greater effect.

Still further, it is possible to incorporate an intake shutter, decompressor, etc., in each fault mode and control them additionally.

In accordance with the invention, by virtue of a control unit which receives various sensor data and generates actuator signals and injectors which are provided one for each cylinder and operable separately for each cylinder, there is an effect that if any of the injectors becomes faulty tending to cause a situation which is undesirable from the engine operation point of view, the control unit detects it and switches the operation to a fault mode of operation such that if the fault is in the fuel measuring section, for example, the engine is not stopped and the operation is continued safely while still involving the portion incapable of fuel measurement.

I claim:

1. A method of controlling the injection of fuel into an internal combustion engine having a plurality of unit injectors provided one for each cylinder of the engine and each responsive to electric signals to control the injection of fuel therefrom, said method comprising the steps of:

detecting an operating condition of said engine by sensor means;

discriminating the presence or absence of a malfunction in the injection of fuel from each said injector in accordance with said engine operating condition detected by said sensor means; and supplying, upon discrimination of a malfunction in the injector of any one of said cylinders, to said malfunctioning injector electric control signals which are required for continued operation of said engine but different from those required for a normal operation of said engine, wherein said control signal supplying step supplies electric control signals for cutting off the injection of fuel to said malfunctioning injector and the injector of at least one of said cylinders has a particular order of arrangement relation with the order of arrangement of the other one of said cylinders associated with said malfunctioning injector from the standpoint of balance in the generation of power output.

2. A method of controlling the injection of fuel into an internal combustion engine having a plurality of unit injectors provided one for each cylinder of the engine and each responsive to electric signals to control the injection of fuel therefrom, said method comprising the steps of:

detecting an operating condition of said engine by sensor means;

discriminating the presence or absence of a malfunction in the injection of fuel from each said injector in accordance with said engine operating condition detected by said sensor means; and supplying, upon discrimination of a malfunction in the injector of any one of said cylinders, to said malfunctioning injector electric control signals which are required for continued operation of said engine but different from those required for a normal operation of said engine, wherein said control signal supplying step supplies to said malfunctioning injector electric control signals for cutting off the injection of fuel therefrom and also supplies electric control signals with reduced number of events of fuel injection to the injector of at least one of said cylinders having a particular order of arrangement relation with the order of arrangement of the other one of said cylinders associated with said malfunctioning injector from the standpoint of balance in the generation of power output.

3. A method according to claim 1 or 2, wherein said control signal supplying step supplies control signals such that said injectors each having a particular order of arrangement relation with said cylinder associated with said malfunctioning injector from the standpoint of balance in the generation of power output and subject to fuel injection cut-off are changed successively in accordance with a predetermined order.

4. A method of controlling the injection of fuel into an internal combustion engine having a plurality of unit injectors provided one for each cylinder of the engine and each responsive to electric signals to control the injection of fuel therefrom, said method comprising the steps of:

detecting an operating condition of said engine by sensor means;

discriminating the presence or absence of a malfunction in the injection of fuel from each said injector in accordance with said engine operating condition detected by said sensor means; and supplying, upon discrimination of a malfunction in the injection of any one of said cylinders, to said malfunctioning injector electric control signals which are required for continued operation of said engine but different from those required for a normal operation of said engine, wherein said malfunctioning injector discriminated by said malfunction discriminating step has a malfunction in the fuel measuring means thereof.

5. A method of controlling the injection of fuel into an internal combustion engine having a plurality of unit injectors provided one for each cylinder of the engine and each responsive to electric signals to control the injection of fuel therefrom, said method comprising the steps of:

detecting an operating condition of said engine by sensor means;

discriminating the presence or absence of a malfunction in the injection of fuel from each said injector in accordance with said engine operating condition detected by said sensor means; and supplying, upon discrimination of a malfunction in the injector of any one of said cylinders, to said malfunctioning injector electric control signals which are required for continued operation of said engine but different from those required for a normal operation of said engine, wherein said malfunctioning injector discriminated by said malfunction discriminating step has a malfunction in the injection actuating means thereof.

6. An apparatus for controlling the injection of fuel into an internal combustion engine comprising:

a plurality of unit injector means provided one for each cylinder of said engine, each of said injector means including forced delivery means having a piston and a plunger coupled to said piston to force out fuel in a pump working fluid chamber below said plunger in response to downward movement of said piston, an injection nozzle for injecting said forced-out fuel, valve means for changing a hydraulic pressure in a piston working fluid chamber above said piston to control the vertical movement of said piston and said plunger, and an actuator for measuring the quantity of fuel supplied to said pump working fluid chamber below said plunger corresponding to the quantity of fuel to be injected; and control means for controlling each said injector means by control signals generated in accordance with data applied from sensor means for detecting operating conditions of said engine, so that when a fault occurs in a part of at least one of said injector means with said at least one injector means still capable of supplying fuel, the operation of at least one of the fuel measuring actuator and the valve means of said at least one injector means is controlled so as to operate said at least one injector means in a fault mode of operation and thereby control the quantity of fuel injected.

7. An apparatus according to claim 6, wherein the control of the operation of said valve means in said fault mode of operation is accomplished in such a manner that a timing of decreasing the hydraulic pressure in said piston working fluid chamber above said piston and thereby making said plunger movable upward begins a predetermining time before a regular fuel injection timing thereby controlling the quantity of fuel supplied to said pump working fluid chamber below said plunger through said faulty fuel measuring actuator.

8. An apparatus according to claim 6, wherein said actuator comprises an electromagnetic valve.

9. A method according to claim 1 or 2, wherein said control signal supplying step supplies control signals such that said injectors each having a particular order of arrangement relation with said cylinder associated with said malfunctioning injector from the standpoint of balance in the generation of power output and subject to reduced number of events of injection, are changed successively in accordance with a predetermined order.

* * * * *